T. C. & J. W. JORY.
GRAIN SEPARATOR.
No. 181,181. Patented Aug. 15, 1876.
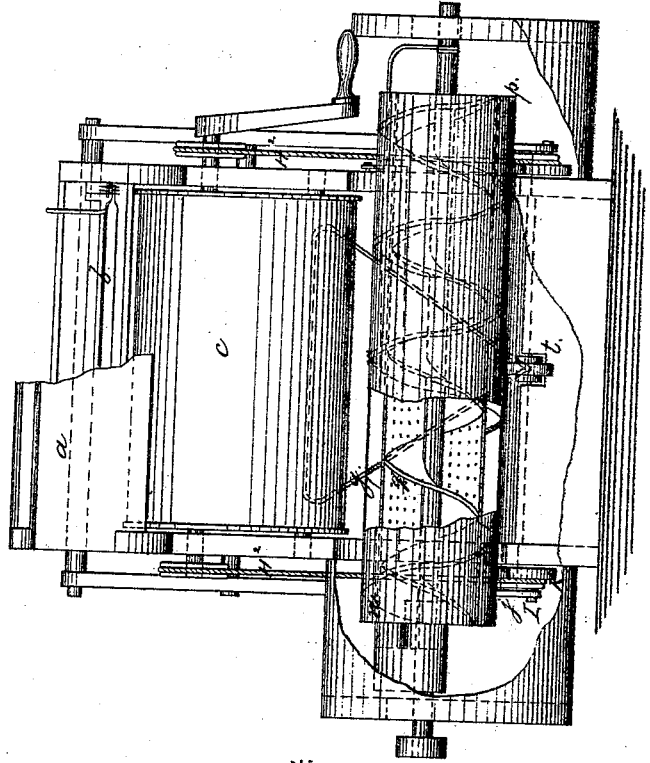
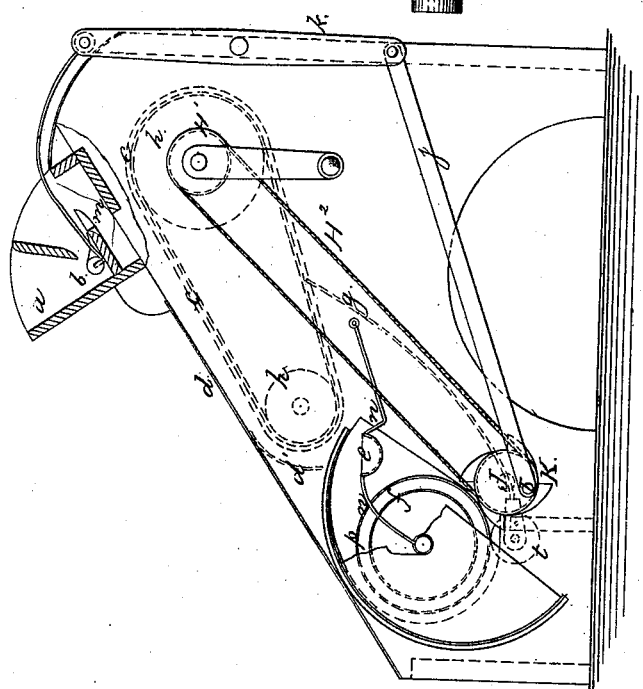
WITNESSES:
H. Rydquist
John Goethals
INVENTOR:
T. C. Jory
BY J. W. Jory
ATTORNEYS

UNITED STATES PATENT OFFICE.

THOMAS C. JORY AND JOHN W. JORY, OF SALEM, OREGON.

IMPROVEMENT IN GRAIN-SEPARATORS.

Specification forming part of Letters Patent No. 181,181, dated August 15, 1876; application filed April 4, 1876.

*To all whom it may concern:*

Be it known that we, THOMAS C. JORY and JOHN W. JORY, of Salem, in the county of Marion and State of Oregon, have invented a new and improved Grain-Separator, of which the following is a specification:

Our improved separator is designed especially for cleaning wheat, but will, by proper adjustment, separate oats from wild oats. It involves in construction the following four principal features: First, a regulating and distributing feeder, by which the same amount of grain flows from the hopper at each turn of the crank, and is evenly distributed over the entire surface of the cleaning apparatus; second, an arrangement by which cockle and other small seeds are separated from wheat, the same being a revolving cylindrical screen, through which, as it revolves, the grain is conveyed by a spiral flange closely fitted to its inner surface throughout its entire length, and a plain hollow cylinder of sheet iron, surrounding the screen and concentric with it, and having a flange working in the opposite direction to receive and discharge the seeds, small grain, &c., at the opposite end. Thus the wheat flows from one end of the revolving cylinder, and the small seeds from the other, and both may be collected in proper receptacles. Third, an arrangement for keeping the screening apparatus clean, by a vertical shake communicated to it (as is also its rotary motion) by cam-wheels revolving under each end of the screen.

The carrier is kept free from wild oats, &c., by means of a stirrup-shaped knocker, which strikes a quick light stroke on the under surface of the carrier at each descent of the screen, from which it takes its motion.

Figure 1 is a sectional elevation of my improved grain-cleaner, and Fig. 2 is a front elevation with a part broken out.

Similar letters of reference indicate corresponding parts.

$a$ is the hopper, for receiving the grain to be cleaned; $b$, scraper for regulating the flow of grain from the hopper; $c$, inclined revolving endless carrier or apron for removing oats, wild oats, &c., from wheat; $d$, cover over the carrier, which, being placed close to the carrier, keeps the grain in contact with the surface of the latter by preventing its making long leaps in its descent, and also, by means of the curved piece $d'$ soldered to its under surface, guides the grain into the spout. $e$ is the spout for receiving the grain from the carrier, and conveying it to the screen; $f$, cylindrical screen for removing cockle and other small seeds, &c.; $y$, knocker for keeping carrier clear of wild oats, &c.; $h$, two rollers bearing the carrier, the upper roller having a crank, to be turned by the operator, and at each end a pulley, $H^1$, bearing a band, $H^2$, by which rotary motion is communicated to an axle J, beneath the cylindrical screen $f$, said axle having at each end a cam-wheel, K, by which rotary motion is communicated to the screen, also its vertical shake, and also two cranks, $I'$, for operating the scraper $b$ by rods $j$ and levers $k$. The hopper contains two compartments. The grain being placed in the first, a portion of it passes into the second, and is removed by the scraper over the board $m$. The opening between the two compartments of the hopper is of such a size, and the baseboard of the hopper is placed at such an angle, that the grain cannot all pass at once from the first compartment to the second, but only such a part of it as should be removed at each return of the scraper. The carrier $c$ is a broad textile belt, borne on two rollers, and so inclined that wheat falling on it will roll down into the spout, while the oats, wild oats, &c., rollings downward more slowly than the wheat, or adhering instantly to the woolly surface of the carrier, are carried by its revolution over the upper roller, where most of them fall to the floor. The spout for conveying the grain to the screen is inclined from a horizontal position, and receives from the screen, by rods $n$, a vertical shake, which facilitates the removal of the grain to the screen.

The revolving screen for removing cockle, &c., consists of two concentric hollow cylinders. The inner one, which is the screen proper, is of perforated zinc, or other suitable material. On the inside of this is a small solid wooden cylinder, around which a spiral flange, $q$, (dotted,) is wound and firmly fastened. To the outer edge of this spiral the hollow cylinder $f$ of perforated zinc is closely fitted. Around the outside of this perforated cylinder a second spiral, r, (dotted,) is wound in an opposite direction from the first. The outer edges of this spiral fit closely to the inner surface of the outer cylinder p of plain sheet iron. In the center of one end of the cylinder is a circular opening communicating with the inside of the screen; into this the mouth of the spout is inserted. The mixed grain is conveyed to the screen at this point. The pure wheat, conveyed through the cylinder by the inside spiral, is discharged at the end nearest the operator, through an opening made for the purpose, while the cockle, &c., having descended through the perforations of the screen to the outer cylinder, are conveyed, by the outer spiral, to an opening near the circumference of the end at which they entered, and there discharged. The vertical shake of the screen keeps it from clogging, as explained before. The knocker for keeping the under surface of the carrier free from wild oats, &c., is operated by the screen falling on the friction-wheel t attached near the pivot on which it turns.

Having thus described my invention, I claim as new and desire to secure by Letters Patent—

1. The combination of the reciprocating scraper b with the upwardly-inclined bottom-board of the hopper, as and for the purpose specified.

2. The imperforate cockle-conveying cylinder p, in combination with the wheat-screen f, having the exterior fixed spiral flange r, and attached to the rotating shaft or axis by means of the spiral flange q, as shown and described, whereby the mixed wheat and cockle are separated, conveyed in opposite directions, and discharged at opposite ends of the screen and cylinder respectively, as shown and specified.

3. The revolving screen f, having rotating and vertical-shaking motion imparted to it by means of cam-wheels K, substantially as specified.

4. The combination of knocker g with the vertically-shaking screen and the apron c, substantially as specified.

THOMAS C. JORY.
JOHN W. JORY.

Witnesses:
H. Y. THOMPSON,
SETH R. HAMMER.